(12) United States Patent
Ubelhart

(10) Patent No.: US 12,255,515 B2
(45) Date of Patent: Mar. 18, 2025

(54) OVERLOAD CLUTCH FOR E-MOTOR ROTOR

(71) Applicant: Schaeffler Technologies AG & Co. KG, Herzogenaurach (DE)

(72) Inventor: Eric Ubelhart, Orville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 413 days.

(21) Appl. No.: 17/671,639

(22) Filed: Feb. 15, 2022

(65) Prior Publication Data

US 2023/0261533 A1 Aug. 17, 2023

(51) Int. Cl.
| | |
|---|---|
| *H02K 7/00* | (2006.01) |
| *B60K 6/48* | (2007.10) |
| *F16D 3/12* | (2006.01) |
| *F16D 43/202* | (2006.01) |
| *H02K 1/28* | (2006.01) |

(52) U.S. Cl.
CPC ...... *H02K 7/006* (2013.01); *B60K 2006/4825* (2013.01); *F16D 3/12* (2013.01); *F16D 43/2028* (2013.01); *H02K 1/28* (2013.01)

(58) Field of Classification Search
CPC .... B60K 6/26; B60K 6/38; B60K 6/383–387; B60K 6/40; B60K 6/48; B60K 2006/262; B60K 2006/4825; H02K 1/28–30; H02K 7/006; F16D 3/04; F16D 3/52; F16D 3/56; F16D 3/76–79; F16D 7/02–048; F16D 43/20–202; F16D 43/2028
See application file for complete search history.

(56) References Cited

U.S. PATENT DOCUMENTS

| | | | |
|---|---|---|---|
| 6,927,526 B2* | 8/2005 | Ishii .................. | H02K 1/28 |
| | | | 310/156.08 |
| 10,690,198 B2* | 6/2020 | Puiu .................... | F16D 43/206 |
| 11,575,294 B2* | 2/2023 | Satyaseelan ........... | B60K 6/40 |
| 2021/0237551 A1* | 8/2021 | Satyaseelan ........... | B60K 6/48 |

FOREIGN PATENT DOCUMENTS

WO WO-2021254562 A1 * 12/2021 ............. F16D 7/024

\* cited by examiner

*Primary Examiner* — James J Taylor, II
(74) *Attorney, Agent, or Firm* — Volpe Koenig

(57) ABSTRACT

A hybrid drive assembly having an e-motor with a housing fixed stator and a rotor that connects to a transmission. The e-motor rotor includes a rotor support having a mounting flange with a stop at one end. A diaphragm spring clamps a second rotor ring, a rotor stack, and a first rotor ring against the stop to rotationally fix the rotor stack to the mounting flange. A drive plate assembly for connection to a crankshaft includes an output flange that is: (a) frictionally engaged to the diaphragm spring and/or the second rotor ring such that upon application of a torque spike the output flange rotates relative to the diaphragm spring and/or the second rotor ring, or (b) rotationally fixed to the diaphragm spring such that upon application of a torque spike the diaphragm spring rotates relative to the mounting flange, forming in each case an overload clutch.

12 Claims, 3 Drawing Sheets

OVERLOAD CLUTCH FOR E-MOTOR ROTOR

TECHNICAL FIELD

The disclosure relates to a drivetrain for a hybrid motor vehicle, in particular to a device for preventing damage to the hybrid drive assembly in the event of a sudden stop in a portion of the drivetrain.

BACKGROUND

Automotive OEMs and Tier 1 suppliers to OEMs have been considering different major powertrain architectures for MHEVs (Mild Hybrid Electric Vehicles). In these architectures, the electric motor (e-motor) can be positioned relative to the other powertrain components at five major points, referred to as P0 to P4. P0 is located at the front end of the ICE (internal combustion engine), and is typically a front end accessory drive that provides power to the crankshaft via a belt. P1 provides for a direct connection to the crankshaft of the electric motor. P0 and P1 architectures do not allow mechanical disconnection of the electric motors from the ICE. P2 architecture provides a side attached electric motor between the ICE and the transmission that is disconnectable from the ICE. P3 architecture provides for an electric motor that is connected to the transmission via intermeshing gears. Finally, P4 architecture provides for an electric motor that is connected to the drive axle via intermeshing gears. The P2-P4 architectures all allow the electric motor to be disconnected from the ICE, typically with clutches. However, these arrangements take more space and are more complex.

P1 architectures have been used in the automotive industry and can be found in some small passenger cars where the e-motor is directly connected to the crankshaft before the vehicle transmission and downstream drive line. Such arrangements provide a rotor of the hybrid electric motor mounted to an input shaft that is directly connected to the crankshaft.

An issue in the known P1 architectures is that the inertia of the e-motor and sub components further down the system can in certain situations come to a sudden stop, while the engine or gear set is still wanting to spin. Here, the inertias can cause a very large instantaneous torque spike and create major damage of components.

It would be desirable to provide a hybrid architecture, and specifically a P1 architecture, that can address a sudden stop condition without or only minimally impacting costs, weight, and/or space requirements.

SUMMARY

In one aspect, a hybrid drive assembly for a motor vehicle is provided that is configured to prevent damage to the hybrid drive assembly as well as other drivetrain components in the event of a sudden stop in a portion of the drivetrain. The hybrid drive assembly includes a housing, a stator mounted to the housing, as well as a rotor connected to an input shaft that is adapted to be connected to a transmission. The rotor is rotatably mounted within the stator. The rotor includes a rotor support connected to the input shaft, with the rotor support including a generally axially extending mounting flange with a stop located at one axial end region of the mounting flange. A rotor stack is located on the mounting flange, along with first and second rotor rings located on respective first and second axial sides of the rotor stack. A diaphragm spring is located on the mounting flange on an opposite axial end region from the stop and clamps the second rotor ring, the rotor stack, and the first rotor ring against the stop in order to rotationally fix the rotor stack to the mounting flange. A drive plate assembly is provided that is configured to be connected to a crankshaft of an internal combustion engine. The drive plate assembly includes an output flange that is: (a) frictionally engaged to at least one of the diaphragm spring or the second rotor ring such that upon application of a torque spike the output flange rotates relative to the at least one of the diaphragm spring or the second rotor ring, or (b) rotationally fixed to the diaphragm spring such that upon application of a torque spike the diaphragm spring rotates relative to the mounting flange, forming in each case an overload clutch.

These arrangements of the output flange and diaphragm spring form an overload clutch to prevent damage due to torque spikes with minimal changes to the overall hybrid drive assembly configuration. The release torque can be adjusted (i.e., set) by changing the frictional properties of the surface of the mounting flange and/or the diaphragm spring where it contacts the mounting flange, for example by surface roughness, and/or a degree of sliding or interference fit, and/or by adjusting the diaphragm spring rate.

In one embodiment, the output flange is rotationally fixed to the diaphragm spring via one or more projections on the output flange engaging in teeth on the diaphragm spring.

In one arrangement, the drive plate assembly includes an input plate that is configured to be connected to the crankshaft, and damper springs located between the input plate and the output flange.

In one arrangement, the input shaft is configured to be supported on one axial end in an opening in an end of the crankshaft. Preferably, a needle bearing is provided for rotational support.

In one arrangement, a resolver rotor is connected to the rotor and a position sensor is connected to the housing. This allows for position sensing of the rotor that is used in connection with activating the e-motor. Preferably, the resolver rotor is located on a radially inner side of the mounting flange.

In one arrangement, the input shaft is configured to be connected to a torque converter.

In one arrangement, the assembly includes the output flange that is frictionally engaged to the at least one of the diaphragm spring or the second rotor ring. Here the frictionally engaged axial surfaces act as a clutch/counter-plate (s) combination that is pressed together by the force of the diaphragm spring. The clamping force generated by the diaphragm spring can be adjusted, and/or the friction properties of the engaging axial faces of the clutch/counter-plate (s) combination can be adjusted in order to adjust (i.e., set) the release torque for the thus formed overload clutch.

Here, the drive plate assembly can include an input plate that is configured to be connected to the crankshaft, and the output flange is rotationally fixed to the input plate.

Alternatively, for the arrangement where the assembly includes the output flange that is frictionally engaged to at least one of the diaphragm spring or the second rotor ring, the drive plate assembly can include an input plate that is configured to be connected to the crankshaft, and damper springs are located between the input plate and the output flange in order to form a damper assembly to equalize oscillations caused by the ICE.

In another aspect, a method is provided for forming an overload clutch for protecting a hybrid drive arrangement that includes a housing, a stator mounted to the housing, and a rotor connected to an input shaft that is adapted to be connected to a transmission, with the rotor being rotatably mounted within the stator. The method includes the steps of:

Providing the rotor with a rotor support connected to the input shaft, the rotor support including a generally axially extending mounting flange with a stop located at one axial end region of the mounting flange, a rotor stack located on the mounting flange, first and second rotor rings located on respective first and second axial sides of the rotor stack;

Pressing a diaphragm spring on the mounting flange on an opposite axial end region from the stop, clamping the second rotor ring, the rotor stack, and the first rotor ring against the stop in order to rotationally fix the rotor stack to the mounting flange; and Providing a drive plate assembly configured to be connected to a crankshaft of an internal combustion engine, the drive plate assembly including an output flange, and one of:

(a) Frictionally engaging the output flange to at least one of the diaphragm spring or the second rotor ring such that application of a torque spike causes the output flange to rotate relative to the at least one of the diaphragm spring or the second rotor ring, or (b) Rotationally fixing the output flange to the diaphragm spring such that application of a torque spike causes the diaphragm spring to rotate relative to the mounting flange.

Accordingly, overload protection is provided that eliminates potential damage to the hybrid drive assembly components, as well as other driveline components For the method including step (a), the rotationally fixing can include engaging one or more projections on the output flange in teeth on the diaphragm spring.

For the method including step (b), the frictionally engaging can include locating the output flange between the diaphragm spring and the second rotor ring.

In each case, an overload clutch is formed that protects the components of the hybrid drive arrangement as well as other drivetrain components.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
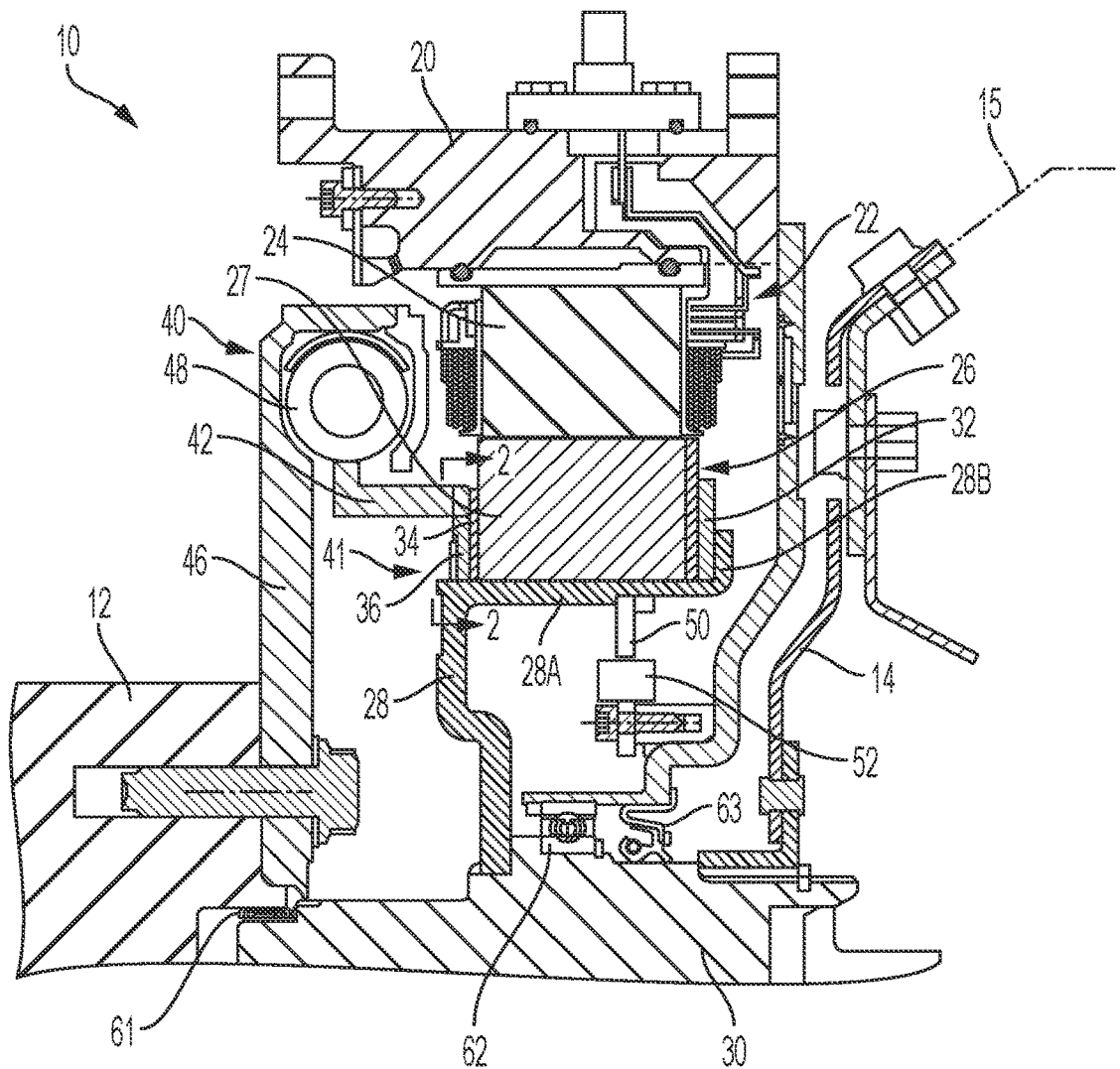
FIG. 1 is a half cross-sectional view of a hybrid drive assembly according to a first embodiment.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Figure 2:
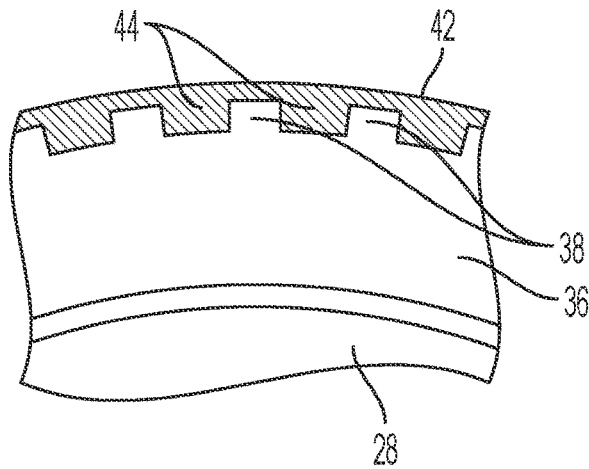
FIG. 2 is a view taken along line 2-2 in FIG. 1.

Referring to FIGS. 1 and 2, a first embodiment of a hybrid drive assembly 10 for a motor vehicle is shown. The hybrid drive assembly 10 is located between the crankshaft 12 of an internal combustion engine and further part of the drive-line, for example a torque converter 15 (schematically represented) that is connected to a transmission.

The hybrid drive assembly includes a housing 20 in which an electric motor (e-motor) 22 is located. The e-motor 22 is formed from a stator 24 mounted to the housing 20 as well as a rotor 26 rotatably mounted within the stator 24. The rotor 26 is connected to an input shaft 30 that is adapted to be connected to a transmission, for example via a torque converter connection 14.

The rotor 26 includes a rotor support 28 that is connected to the input shaft 30. The rotor support 28 has a generally axially extending mounting flange 28A with a stop 28B located at one axial end region of the mounting flange 28A. In the illustrated embodiment, the rotor support 28 is formed in one piece. However, this could be formed as multiple pieces that are connected together. A rotor stack 27 that forms that magnetized part of the rotor 26 is located on the mounting flange 28A. First and second rotor rings 32, 34, which can be made of aluminum or another non-magnetic material, are located on respective first and second axial sides of the rotor stack 27. A diaphragm spring 36 is located on the mounting flange 28A on an opposite axial end region from the stop 28B and clamps the second rotor ring 34, the rotor stack 27, and the first rotor ring 32 against the stop 28B in order to rotationally fix the rotor stack 27 to the mounting flange 28A.

A drive plate assembly 40 that is configured to be connected to the crankshaft 12 of the internal combustion engine is provided, with the drive plate assembly 40 including an output flange 42 that is used in connection with the rotor 26 to form an overload clutch 41. In the first embodiment of the hybrid drive assembly 10, the output flange 42 is rotationally fixed to the diaphragm spring 36 such that, upon application of a torque spike, the diaphragm spring 36 rotates relative to the mounting flange 28A, forming the overload clutch 41. The necessary torque to activate the overload clutch can be set based on the frictional force between the diaphragm spring 36 and the axially extending mounting flange 28A upon which it is arranged based on the surface finish or texture of the mounting flange 28A and the contact area of the diaphragm spring 36 thereon.

As shown in FIGS. 1 and 2, the output flange 42 can be rotationally fixed to the diaphragm spring 36 via one or more projections 44 on the output flange 42 engaging in teeth 38 of the diaphragm spring 36. While a toothed engagement is shown in FIG. 2, other types of rotationally fixed connections between the output flange 42 and the diaphragm spring 36 can be provided. These are preferably releasably engaged in order to allow for repair and maintenance.

Still with reference to FIG. 1, in this embodiment the drive plate assembly 40 includes an input plate 46 that is configured to be connected to the crankshaft 12, as well as damper spring(s) 48 located between the input plate 46 and the output flange 42, forming a damper assembly. This is used to smooth torque fluctuations between the torque transmitted via the crankshaft 12 of the internal combustion engine to the drive plate assembly 40 versus the torque provided by the e-motor 22.

In the first embodiment of the hybrid drive assembly 10, the input shaft 30 is configured to be supported on one axial end 30A in an opening 13 in an end of the crankshaft 12. Preferable, this support is provided via a needle bearing 61.

As shown, a further bearing 62 is provided between a fixed portion extending from the housing 20 and the input shaft 30 to support the input shaft 30. A seal 63 is also shown. The torque converter connection 14 is preferably also rotationally fixed to the input shaft 30 via a splined connection, as shown, and is drivingly engaged with a housing of the torque converter 15.

Still with reference to FIG. 1, preferably a revolver rotor 50 is connected to the rotor 26 and a position sensor 52 is connected to the housing 20. The resolver rotor 50 is used to determine a position of the rotor 26 which is useful for start and stop operations of the e-motor 22. As shown in FIG. 1, the resolver rotor 50 is preferably located on a radially inner side of the mounting flange 28A.

Figure 3:
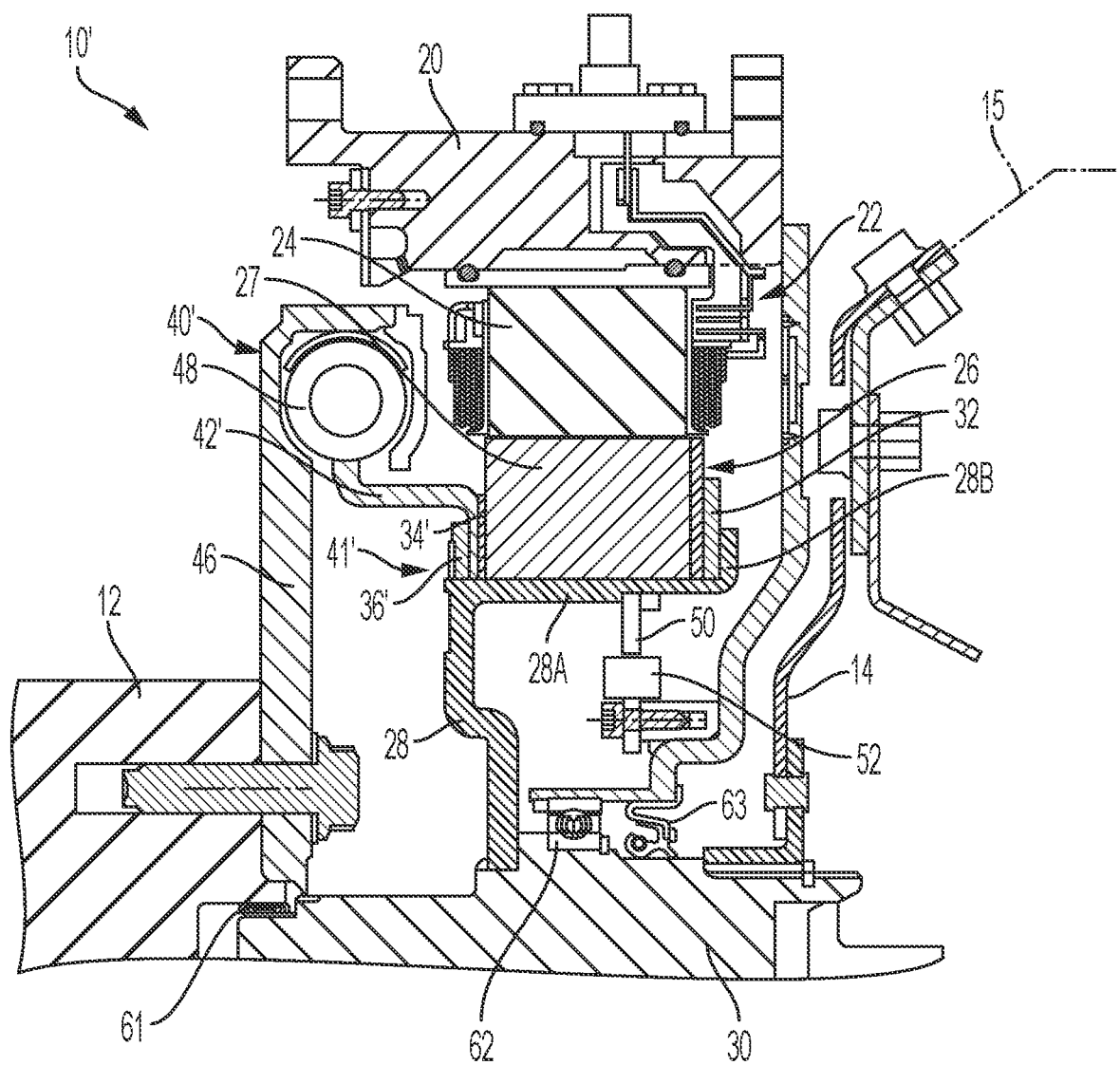
FIG. 3 is a half cross-sectional view of a hybrid drive assembly according to a second embodiment.

Referring now to FIG. 3, a second embodiment of the hybrid drive assembly 10' is shown. The second embodiment of the hybrid drive assembly 10' is similar to the first embodiment of the hybrid drive assembly 10 and like elements have been labeled with the same element numbers. In this arrangement, instead of the output flange 42' of the drive plate assembly 40' being rotationally fixed to the diaphragm spring 36', the output flange 42' is frictionally engaged to at least one of the diaphragm spring 36' or the second rotor ring 34'. This forms a frictional engagement when the diaphragm spring 36' is pressed onto the mounting flange 28A to clamp the second rotor ring 34', the rotor stack 27, and the first rotor ring 32 against the stop 28B, with the output flange 42' being located between the diaphragm spring 36' and the second rotor ring 34', and this frictional engagement provides that, upon application of a torque spike sufficient to overcome the frictional engagement force, the output flange 42' rotates relative to the at least one of the diaphragm spring 36' or the second rotor ring 34'.

Here, the frictionally engaged axial surfaces of the diaphragm spring 36', the output flange 42' and the second rotor ring 34' act as a clutch plate/counter-plate(s) combination of an overload clutch 41' that is pressed together by the force of the diaphragm spring 36'. The clamping force generated by the diaphragm spring 36' can be adjusted, and/or the friction properties of the engaging axial faces of the clutch/counter-plate(s) combination thus formed can be adjusted in order to adjust (i.e., set) the release torque for the thus formed overload clutch 41'.

Accordingly, in this case the overload clutch 41' also protects the hybrid drive assembly 10' as well as other drive line components from a torque spike causing damage.

Still with reference to FIG. 3, in the second embodiment, the drive plate assembly 40' includes an input plate 46 that is configured to be connected to the crankshaft 12 and damper springs 48 are located between the input plate 46 and the output flange 42'. Accordingly, a damper assembly is provided between the crankshaft 12 and the input shaft 30 in order to smooth out any torque fluctuations transmitted via the crankshaft 12 from the internal combustion engine.

Figure 4:
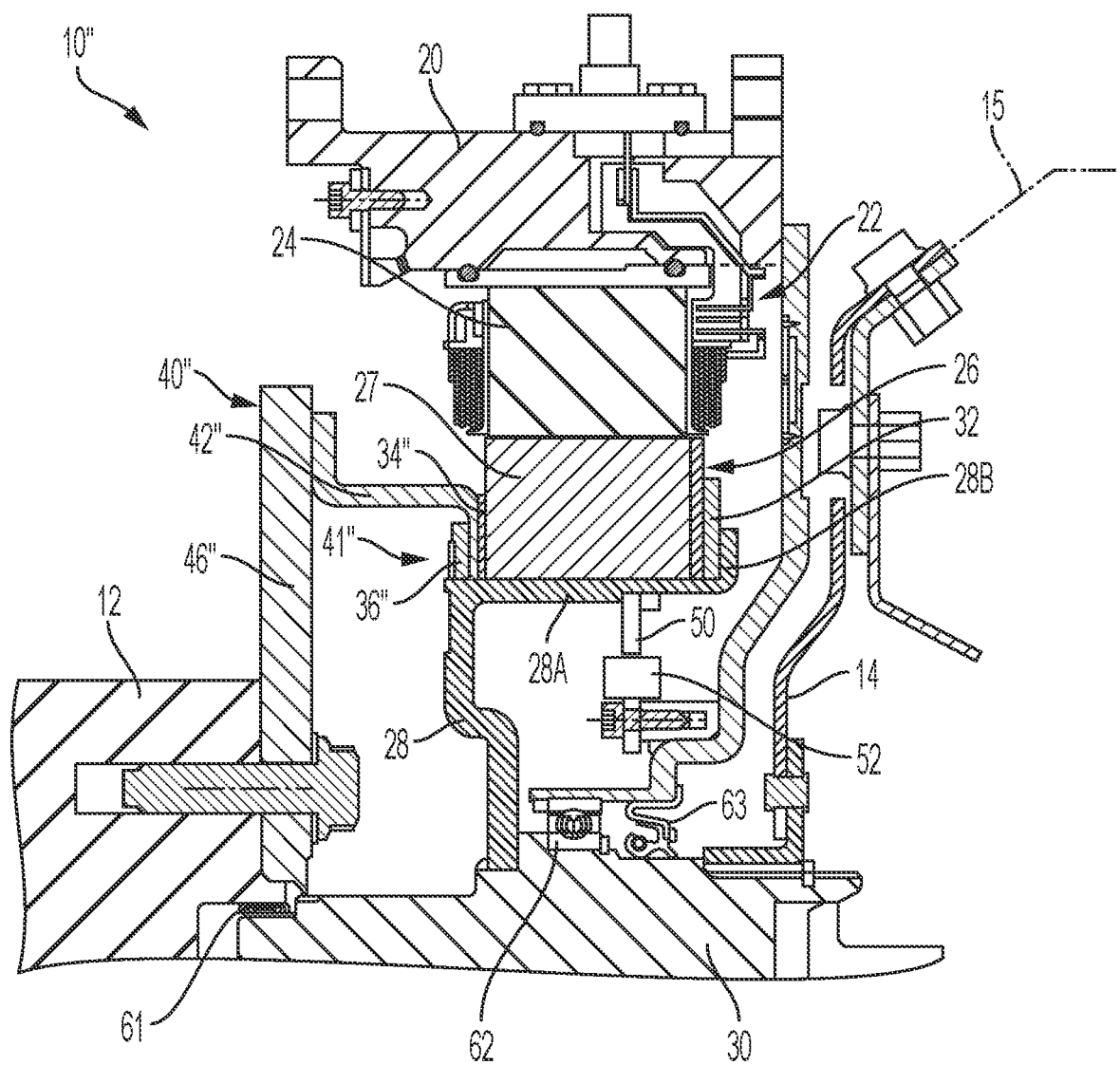
FIG. 4 is a half cross-sectional view of a hybrid drive assembly according to a third embodiment.

Referring now to FIG. 4, a third embodiment of a hybrid drive assembly 10" is shown. The third embodiment of the hybrid drive assembly 10" is similar to the second hybrid drive assembly 10' and like elements have the same element numbers. The output flange 42" is formed with a portion that is frictionally engaged to at least one of the diaphragm spring 36" or the second rotor ring 34" to form an overload clutch 41", similar to the overload clutch 41' described above.

In this embodiment, the drive plate assembly 40" is formed having a rotationally fixed connection between the output flange 42" and the input plate 46". Therefore, no separate damager assembly is provided via the drive plate assembly 40.

A method of forming an overload clutch 41, 41', 41" for protecting a hybrid drive arrangement 10, 10', 10" is also provided. In each case, the hybrid drive arrangement includes a housing 20 as well as a stator 24 mounted to the housing 20 and a rotor 26 connected to an input shaft 30 that is adapted to be connected to a transmission, preferably via a torque converter connection 14 as discussed above. The rotor 26 is rotatably mounted within the stator 24. The method comprises providing the rotor 26 with a rotor support 28 connected to the input shaft 30, with the rotor support 28 including a generally axially extending mounting flange 28A with a stop 28B located at one axial end region of the mounting flange 28A, and a rotor stack 27 located on the mounting flange 28A. First and second rotor rings 32, 34 are located on respective first and second axial sides of the rotor stack 27, with the rotor rings 32, 34 preferably being made of a non-ferrous material.

The method further includes pressing a diaphragm spring 36. 36', 36" on the mounting flange 28A on an opposite axial end region from the stop 28B, clamping the second rotor ring 34, 34', 34", the rotor stack 27, and the first rotor ring 32 against the stop 28B in order to rotationally fix the rotor stack 27 to the mounting flange 28A.

The method further includes providing a drive plate assembly 40, 40', 40" that is configured to be connected to a crankshaft 12 of an internal combustion engine, with the drive plate assembly 40, 40', 40" includes an output flange 42, 42', 42".

The method further includes frictionally engaging the output flange 42', 42" to at least one of the diaphragm springs 36', 36" or the second rotor ring 34', 34" such that application of a torque spike causes the output flange 42', 42" to rotate relative to the at least one of the diaphragm spring 36', 36" or the second rotor ring 34', 34", as shown in FIGS. 3 and/or 4. Preferably, the frictional engagement is provided by locating that output flange 42', 42" between the diaphragm spring 36', 36" and the second rotor ring 34', 34" in order to form the overload clutch 41', 41".

Alternatively, the method can include rotationally fixing the output flange 42 to the diaphragm spring 36 such that application of a torque spike causes the diaphragm spring 36 to rotate relative to the mounting flange 28A, as shown in FIGS. 1 and 2.

As discussed above, the rotational fixing of the output flange 42 to the diaphragm spring 36 can include the use of projections 44 on the output flange 42 engaging in teeth 38 on the diaphragm spring 36, as shown in FIGS. 1 and 2.

In either case, the method provides overload protection through the formation of an overload clutch 41, 41', 41".

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10, 10', 10" hybrid drive assembly
12 crankshaft
13 opening
14 torque converter connection
15 torque converter
20 housing
22 e-motor
24 stator
26 rotor
27 rotor stack
28 rotor support
28A mounting flange
28B stop
30 input shaft
30A one axial end
32 first rotor ring
34, 34', 34" second rotor ring
36, 36', 36" diaphragm spring
38 teeth
40, 40', 40" drive plate assembly
41, 41', 41" overload clutch
42, 42', 42" output flange
44 projections
46, 46" input plate
48 damper spring(s)
50 resolver rotor
52 position sensor
61 needle bearing
62 bearing
63 seal

The invention claimed is:

1. A hybrid drive assembly for a motor vehicle, the hybrid drive assembly comprising:
   a housing;
   a stator mounted to the housing;
   a rotor connected to an input shaft that is adapted to be connected to a transmission, the rotor being rotatably mounted within the stator;
   the rotor including a rotor support connected to the input shaft, the rotor support including an axially extending mounting flange with a stop located at one axial end region of the mounting flange, a rotor stack located on the mounting flange, first and second rotor rings located on respective first and second axial sides of the rotor stack, and a diaphragm spring located on the mounting flange on an opposite axial end region from the stop that clamps the second rotor ring, the rotor stack, and the first rotor ring against the stop in order to rotationally fix the rotor stack to the mounting flange; and
   a drive plate assembly configured to be connected to a crankshaft of an internal combustion engine, the drive plate assembly including an output flange that (a) is frictionally engaged to at least one of the diaphragm spring or the second rotor ring such that upon application of a torque spike the output flange rotates relative to the at least one of the diaphragm spring or the second rotor ring, or (b) is rotationally fixed to the diaphragm spring such that upon application of a torque spike the diaphragm spring rotates relative to the mounting flange, to form an overload clutch.

2. The hybrid drive assembly of claim 1, wherein the output flange is rotationally fixed to the diaphragm spring via one or more projections on the output flange engaging in teeth on the diaphragm spring.

3. The hybrid drive assembly of claim 1, wherein the drive plate assembly includes an input plate that is configured to be connected to the crankshaft, and damper springs located between the input plate and the output flange.

4. The hybrid drive assembly of claim 1, wherein the input shaft is configured to be supported on one axial end in an opening in an end of the crankshaft.

5. The hybrid drive assembly of claim 1, further comprising a resolver rotor connected to the rotor and a position sensor connected to the housing.

6. The hybrid drive assembly of claim 5, wherein the resolver rotor is located on a radially inner side of the mounting flange.

7. The hybrid drive assembly of claim 1, wherein the input shaft is configured to be connected to a torque converter.

8. The hybrid drive assembly of claim 1, wherein the drive plate assembly comprises the output flange that is frictionally engaged to the at least one of the diaphragm spring or the second rotor ring, and the drive plate assembly includes an input plate that is configured to be connected to the crankshaft, and the output flange is rotationally fixed to the input plate.

9. The hybrid drive assembly of claim 1, wherein the drive plate assembly comprises the output flange that is frictionally engaged to the at least one of the diaphragm spring or the second rotor ring, and the drive plate assembly includes an input plate that is configured to be connected to the crankshaft, and damper springs are located between the input plate and the output flange.

10. A method of forming an overload clutch for protecting a hybrid drive arrangement that includes a housing, a stator mounted to the housing, and a rotor connected to an input shaft that is adapted to be connected to a transmission, with the rotor being rotatably mounted within the stator, the method comprising:
    providing the rotor with a rotor support connected to the input shaft, the rotor support including an axially extending mounting flange with a stop located at one axial end region of the mounting flange, a rotor stack located on the mounting flange, first and second rotor rings located on respective first and second axial sides of the rotor stack;
    pressing a diaphragm spring on the mounting flange on an opposite axial end region from the stop, clamping the second rotor ring, the rotor stack, and the first rotor ring against the stop in order to rotationally fix the rotor stack to the mounting flange; and
    providing a drive plate assembly configured to be connected to a crankshaft of an internal combustion engine, the drive plate assembly including an output flange, and one of:
    (a) frictionally engaging the output flange to at least one of the diaphragm spring or the second rotor ring such that application of a torque spike causes the output flange to rotate relative to the at least one of the diaphragm spring or the second rotor ring, or
    (b) rotationally fixing the output flange to the diaphragm spring such that application of a torque spike causes the diaphragm spring to rotate relative to the mounting flange.

11. The method of claim 10, wherein the rotationally fixing includes engaging one or more projections on the output flange in teeth on the diaphragm spring.

12. The method of claim 10, wherein the frictionally engaging includes locating the output flange between the diaphragm spring and the second rotor ring.

* * * * *